United States Patent Office 3,538,112
Patented Nov. 3, 1970

3,538,112
TETRAHYDROCARBAZOLYL-LOWER-ALKYL-AMIDOXIMES AND -AMIDINES
Malcolm R. Bell, East Greenbush, N.Y., assignor to Sterling Drug Inc., New York, N.Y., a corporation of Delaware
No Drawing. Continuation-in-part of application Ser. No. 631,916, Apr. 19, 1967. This application Oct. 14, 1968, Ser. No. 767,465
Int. Cl. A61k 27/00; C07d 27/68
U.S. Cl. 260—315
8 Claims

ABSTRACT OF THE DISCLOSURE

New tetrahydrocarbazolyl-lower-alkylamidoximes and -amidines having useful hypotensive and monoamine oxidase inhibitory activities.

This application is a continuation-in-part of my prior copending application Ser. No. 631,916, filed Apr. 19, 1967, now abandoned, which in turn is a continuation-in-part of my prior copending application Ser. No. 519,458, filed Jan. 10, 1966, now U.S. Pat. 3,478,039, patented Nov. 11, 1969, which in turn is a continuation-in-part of my prior application Ser. No. 345,846, filed Feb. 19, 1964, now U.S. Pat. 3,354,174, patented Nov. 21, 1967.

This invention relates to the field of amidoximes and amidines, their acid-addition salts, and to intermediates and processes therefor.

The compounds of the invention are represented by the general formulas:

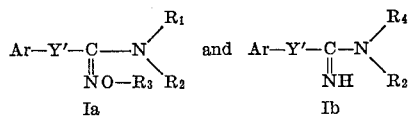

wherein Ar is 9-(1,2,3,4-tetrahydrocarbazolyl); $R_1$ is hydrogen, lower-alkyl, lower-alkenyl, lower-alkynyl, lower-alkanoyl, or hydroxy; $R_2$ and $R_4$ each is hydrogen, lower-alkenyl, lower-alkynyl, lower-alkyl, or benzyl; $R_3$ is hydrogen, lower-alkanoyl, benzoyl, lower-alkyl, or benzyl; and Y′ is alkylene containing from one to five carbon atoms. Moreover Y′ can also be substituted on any of the carbon atoms thereof by a hydroxy group. The more convenient synthetic methods are based on use of an aldehyde cyanohydrin of the nitrile, Ar—Y′—CN, in the general procedures described herein, and these methods afford those compounds where the hydroxy group is attached to the carbon atom adjacent to the amidoxime group (Formula Ia) or the amidine group (Formula Ib), and such compounds are preferred.

In the above Formulas Ia and b, $R_1$, $R_2$ and $R_4$ represent lower-alkenyl, e.g. 1-(2-propenyl), 1-(2-methyl-2-propenyl), and the like, or lower-alkynyl, e.g. 1-(2-propynyl) or 1-(2-butynyl). Moreover, in the compounds of Formula Ib, the groups $R_2$ and $R_4$ on the terminal nitrogen atom can be the same or different or can be joined together either through an alkylene chain or an alkylene chain interrupted by a hetero atom to form, with the nitrogen atom to which they are attached, a heterocyclic ring such as pyrrolidine, piperidine, morpholine, thiomorpholine, and the like.

The compounds of Formula Ia where Y′ is a hydroxyalkylene group having the hydroxy group attached to the carbon atom adjacent to the amidoxime group have the structure:

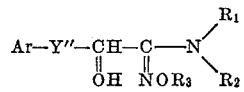

where $R_1$, $R_2$, $R_3$, and Ar have the meanings given above, and Y‴ is $C_mH_{2m}$ where $m$ is an integer from 0 to 4.

In the above general Formulas Ia and Ib, when $R_1$, $R_2$, $R_3$, or $R_4$ represent lower-alkyl, the lower-alkyl moiety can be straight or branched and can contain from one to about four carbon atoms. Thus $R_1$, $R_2$, $R_3$, and $R_4$ represent, inter alia, methyl, ethyl, isopropyl, or n-butyl.

In the above general Formula Ia, when $R_1$ and $R_3$ are lower-alkanoyl, they can be straight or branched and can contain from one to about four carbon atoms. Thus $R_1$ and $R_3$ represent, inter alia, formyl, acetyl, propionyl, or isobutyryl.

In the above general Formulas Ia and Ib, Y′ represents alkylene which can be straight or branched and thus stands, inter ali, for methylene, 1,2-ethylene, 2-methylethylene, 1,3-propylene, 2-methyl-1,4-butylene, and 1,5-pentylene.

In the above general Formulas Ia and Ib, when $R_1$, $R_2$, $R_3$, or $R_4$ represent benzyl or in the compounds of Formula Ia, when $R_1$ or $R_3$ represent benzoyl, the benzene ring thereof can be unsubstituted or can bear one or more substituents of low molecular weight and of such nature that they do not interfere with or take part in the reactions, to be described hereinafter, used in the preparation of the compounds. Moreover, the nucleus of the 9-(1,2,3,4-tetrahydrocarbazolyl) group, Ar, in any of the compounds of Formulas Ia or Ib can also be further substituted in the benzbenoid ring thereof by one or more of such substituents. Examples of such substituents include halogen, lower-alkyl, lower-alkoxy, lower-alkylmercapto, lower-alkylsulfinyl, lower alkylsulfonyl, nitro, trifluoromethyl, methylenedioxy, benzyloxy, benzyl, isonitrosomethyl, di-lower-alkylamino, lower-alkanoyl, sulfamoyl, and the like.

Particularly preferred compounds of the invention are those of Formula Ia wherein $R_1$, $R_2$, and $R_3$ are each hydrogen or lower-alkyl, and especially preferred are those wherein $R_1$, $R_2$, and $R_3$ have the latter meanings, and Y′ is methylene. Thus specifically preferred compounds are, for example, α-[9-(1,2,3,4-tetrahydrocarbazolyl)]acetamidoxime, α-[9-(1,2,3,4-tetrahydrocarbazolyl)]-N-methylacetamidoxime, α - [9-(1,2,3,4-tetrahydrocarbazolyl)] acetamidoxime O-methyl ether, α-[9-(1,2,3,4-tetrahydrocarbazolyl)]-N-methylacetamidoxime O-methyl ether, α-[9-(1,2,3,4-tetrahydrocarbazolyl)] - N,N - dimethylacetamidoxime, or α-[9-(1,2,3,4-tetrahydrocarbazolyl)]-N,N-dimethylacetamidoxime O-methyl ether.

The compounds of Formula Ia where $R_1$, $R_2$, and $R_3$ are hydrogen are prepared by reacting 9-(1,2,3,4-tetrahydrocarbazolyl)-lower-alkanonitrile with hydroxylamine (suitably in the form of a hydrohalide salt) in an organic solvent inert under the conditons of the reaction and in the presence of a base, for example, alkali metal hydroxides, alkoxides, or carbonates. A preferred base is an alkali metal carbonate, for example, potassium carbonate or sodium carbonate. Suitable organic solvents are methanol, ethanol, isopropanol, benzene, toluene, and the like. A preferred solvent is ethanol. The reaction is represented by the equation:

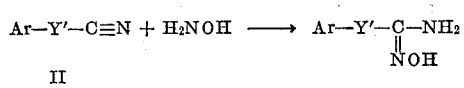

where Ar and Y′ have the meanings given above.

The 9-(1,2,3,4-tetrahydrocarbazolyl) - lower-alkanonitriles of Formula II required as intermediates in the above-described procedure are prepared by a variety of methods. One method involves the direct alkylation on the nitrogen atom of the tetrahydrocarbazole nucleus using an appropriate halo-alkanonitrile in the presence of an acid-acceptor, for example sodium hydride or sodamide.

A second method for the preparation of the 9-(1,2,3,4-tetrahydrocarbazolyl)-lower-alkanonitriles of Formula II in which the alkylene group, Y′, is 1,2-ethylene comprises reacting acrylonitrile with a 1,2,3,4-tetrahydrocarbazole in the presence of a strong base as catalyst, for example, potassium t-butoxide, sodium hydride, organo ammonium hydroxides, for example Triton B®, and the like.

The 1,2,3,4-tetrahydrocarbazoles required as intermediates for the preparation of the 9-(1,2,3,4-tetrahydrocarbazolyl)-lower-alkanonitriles of Formula II are in turn prepared by the Fischer indole synthesis involving reaction of an appropriate phenylhydrazine with cyclohexanone in the presence of an acid catalyst. The reaction is preferably carried out in an organic solvent inert under the conditions of the reaction, for example methanol, ethanol, isopropanol, glacial acetic acid, and the like. Suitable acid catalysts are hydrochloric acid, sulfuric acid, or glacial acetic acid. It is advantageous to use glacial acetic acid which functions both as the acid catalyst and as the solvent medium.

The compounds of Formula I$a$ where $R_1$ is lower-alkyl, lower-alkenyl, or lower-alkynyl and $R_2$ is hydrogen, or where both $R_1$ and $R_2$ are lower-alkyl, lower-alkenyl, or lower-alkynyl are prepared by reacting a hydroxamic chloride derivative of Formula III below, wherein $R_3$, Ar, and Y′ have the meanings given hereinabove, with a lower-alkylamine, a lower-alkenylamine, or lower-alkynylamine, $R_1R_2NH$, or such amine where $R_1$ and $R_2$ are each separately lower-alkyl, lower-alkenyl, or lower-alkynyl.

The compounds of Formula I$a$ where $R_1$ is hydroxy are prepared by reacting a hydroxamic chloride derivative of Formula III below, wherein Ar, Y′, and $R_3$ have the meanings given hereinabove, with hydroxylamine or an N-lower-alkylhydroxylamine, N-lower-alkenylhydroxylamine, or N-lower-alkynylhydroxylamine, $R_2NHOH$. These reactions are represented by the following equations:

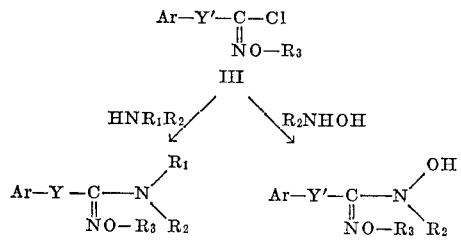

A preferred starting material of Formula III is one wherein $R_3$ is benzyl. The products can then be debenzylated with hydrogen over a suitable catalyst, for example, palladium-on-charcoal or Raney nickel, to produce the compounds of Formula I$a$ where $R_3$ is hydrogen.

The aryl-alkylhydroxamic chloride O-benzyl ethers of Formula III ($R_3$ is $CH_2C_6H_5$) are prepared by reacting the corresponding aryl-alkanoamidoxime O-benzyl ether of Formula I$a$, where $R_1$ and $R_2$ are hydrogen and $R_3$ is benzyl, with an alkali metal nitrite in the presence of hydrochloric acid under diazotization conditions. The reaction is represented by the following equation:

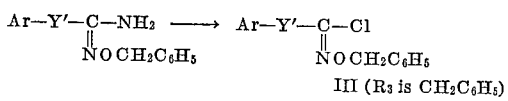

where Ar and Y′ have the meanings given above.

The aryl-alkylhydroxamic chlorides of Formula III where $R_3$ is hydrogen are prepared by the reaction of chlorine in chloroform with the corresponding aldoxime.

The compounds of Formula I$a$ where $R_3$ is lower-alkyl or benzyl are prepared by reacting the corresponding amidoxime, where $R_3$ is hydrogen, with an alkali metal hydride in a suitable organic solvent inert under the conditions of the reaction, for example, dimethylformamide, and reacting the resulting alkali metal salt with a lower-alkyl halide or a benzyl halide. Alternatively, the alkali metal salt can be prepared by reacting the amidoxime with an alkali metal hydroxide in an aqueous or alcoholic medium, e.g. methanol, ethanol, or isopropanol. The reaction is represented by the equation:

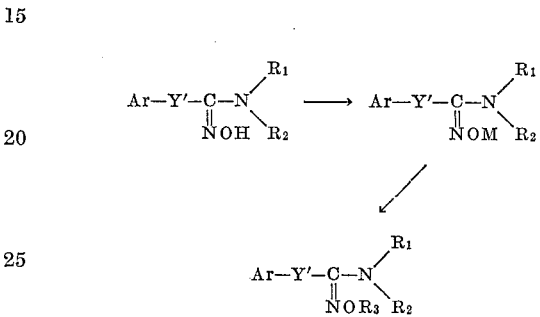

where $R_1$, $R_2$, $R_3$, Ar, and Y′ have the meanings given above, except that $R_1$ is not hydroxy, and M represents an ion of an alkali metal.

The compounds of Formula I$a$ where $R_1$ is lower-alkanoyl are prepared by reacting the corresponding amidoxime ethers, where $R_3$ is lower-alkyl or benzyl and and $R_1$ is hydrogen, with a lower-alkanoyl halide. When it is desired to prepare the compounds of Formula I$a$ where $R_1$ is lower-alkanoyl and $R_3$ is hydrogen, it is necessary to carry out the reaction with the lower-alkanoyl halide using the amidoxime O-benzyl ether ($R_3$ is benzyl). Subsequent catalytic debenzylation affords the compounds where $R_3$ is hydrogen.

The compounds of Formula I$a$ where $R_3$ is lower-alkanoyl or benzoyl and $R_1$ is hydrogen, lower-alkyl, lower-alkenyl, or lower-alkynyl are prepared by reacting the corresponding amidoxime with a lower-alkanoic anhydride or with benzoic anhydride, as the case may be, in the presence of a base such as pyridine. The reaction is preferably carried out in an excess of pyridine, as the solvent medium, and at a temperature in the range from about 0° C. to about 50° C.

The compounds of Formula I$a$ where Y′ is a hydroxyalkylene group with the hydroxy group attached to the carbon atom adjacent to the amidoxime group are prepared by reacting the corresponding cyanohydrin with hydroxylamine using the same conditions as described above for the preparation of the compounds of Formula I$a$ where Y′ is alkylene. The reaction is represented by the equation:

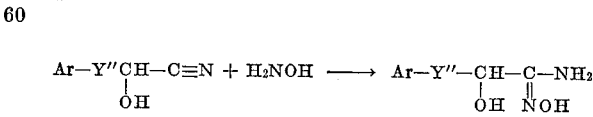

where Ar and Y‴ have the meanings given above.

The intermediate cyanohydrins are prepared by reaction of hydrogen cyanide with the corresponding aryl-alkanaldehyde.

The compounds of Formula I$b$ are prepared by reacting the corresponding aryl-alkanonitrile with a lower-alkanol in the presence of a mineral acid, for example hydrogen chloride, under anhydrous conditions and reacting the resulting imino ester with anhydrous ammonia, or a primary or secondary amine in an anhydrous lower-alkanol. The method is represented by the following equations:

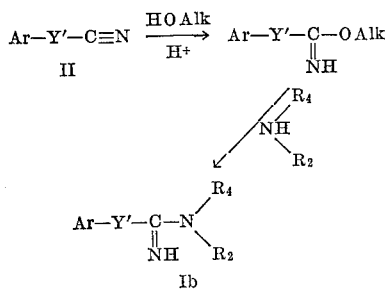

where Ar, $R_2$, $R_4$, and Y′ have the meanings given above, and Alk represents lower-alkyl.

The novel compounds of the instant invention are the bases of Formulas Ia and Ib and the acid-addition salts of said bases, and said acid-addition salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that Formulas Ia and Ib not only represent the structural configurations of the bases of my invention but each is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively they can be converted to pharmaceutically-acceptable acid-addition salts by, for example, ion-exchange procedures.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new amidoximes and amidines, and not in any particular acid anion associated with the salt forms of the compounds; rather, the acid anions, which can be associated in the salt forms, are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formulas Ia and Ib has demonstrated that they lower the blood pressure in dogs and rats thus indicating their usefulness as hypotensive agents. The compounds have also been shown to possess monoamine oxidase inhibitory activity thus indicating their usefulness as tranquilizers.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, or oil solution or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrate specific embodiments of the invention without the latter being limited thereto.

EXAMPLE 1

α-[9-(1,2,3,4-tetrahydrocarbazolyl)]acetamidoxime hydrochloride [Ia: $R_2$, $R_1$, and $R_3$ are H; Y′ is $CH_2$]

A suspension of 11.1 g. (0.23 mole) of 50.7% sodium hydride in mineral oil was added at 35° C. to a solution of 40 g. (0.23 mole) of 1,2,3,4-tetrahydrocarbazole in 240 ml. of dry dimethylformamide and the mixture stirred for an hour and a half. The mixture was then treated dropwise with stirring at 35° C. with 17.6 g. (0.23 mole) of α-chloroacetonitrile, stirred for several hours, and the excess sodium hydride hydrolyzed by the careful addition of water. The mixture was then evaporated to dryness, diluted with water, and extracted with ether. The combined ether extracts were washed with brine, dried, evaporated to dryness, and the residue slurried in 50 ml. of hexane and filtered. The crude material thus obtained was recrystallized from absolute ethanol giving 31.9 g. of α-[9 - (1,2,3,4 - tetrahydrocarbazolyl)]acetonitrile, M.P. 75° C. (uncorr.).

The latter (0.15 mole) was dissolved in 1300 ml. of ethanol along with 21.2 g. (0.30 mole) of hydroxylamine hydrochloride and 35.6 g. (0.34 mole) of sodium carbonate, and the mixture was refluxed for twenty-four hours. The mixture was allowed to cool to room temperature and was then filtered and evaporated to dryness. The residue was dissolved in a solution containing 30 ml. of 5 N ethereal hydrogen chloride in absolute alcohol, the mixture evaporated to dryness once more, and the residue slurried with hot tetrahydrofuran, filtered, and recrystallized from an ethanol/tetrahydrofuran/dry ether mixture to give 5.6 g. of α-[9-(1,2,3,4-tetrahydrocarbazolyl)]-acetamidoxime hydrochloride, M.P. 168–169° C. (corr.).

Analysis.—Calcd. for $C_{14}H_{17}N_3O \cdot HCl$: N, 15.02; Cl, 12.67. Found: N, 15.20; Cl, 12.61.

EXAMPLE 2

α-[9 - (1,2,3,4 - tetrahydrocarbazolyl)]acetamidoxime O-benzyl ether [Ia: $R_1$ and $R_2$ are H; $R_3$ is $C_6H_5CH_2$; Y' is $CH_2$]

By reacting α-[9 - (1,2,3,4 - tetrahydrocarbazolyl)]-acetamidoxime with benzyl chloride, 4-methylmercaptobenzyl chloride, 4-methylsulfonylbenzyl chloride, or 4-trifluoromethylbenzyl chloride, in the presence of sodium hydroxide, there can be obtained, respectively, α-[9-(1,2,3,4 - tetrahydrocarbazolyl)]acetamidoxime O-benzyl ether, O-(4-methylmercaptobenzyl) ether, O-(4-methylsulfonylbenzyl) ether, or O-(4-trifluoromethylbenzyl) ether.

EXAMPLE 3

α-[9 - (1,2,3,4 - tetrahydrocarbazolyl)]acetamidoxime O-methyl ether [Ia: $R_1$ and $R_2$ are H; $R_3$ is $CH_3$; Y' is $CH_2$]

By reacting α-[9 - (1,2,3,4 - tetrahydrocarbazolyl)]-acetamidoxime with methyl iodide in the presence of sodium hydroxide, there can be obtained α-[9-(1,2,3,4-tetrahydrocarbazolyl)]acetamidoxime O-methyl ether.

Similarly, reaction of α-[9 - (1,2,3,4 - tetrahydrocarbazolyl)]acetamidoxime with butyl bromide in the presence of sodium hydroxide affords α-[9-(1,2,3,4-tetrahydrocarbazolyl)]acetamidoxime O-butyl ether.

EXAMPLE 4

α-[9 - (1,2,3,4 - tetrahydrocarbazolyl)]N,N-diethylacetamidoxime [Ia: $R_1$ and $R_2$ are $C_2H_5$; $R_3$ is H; Y' is $CH_2$]

By reacting the α-[9-(1,2,3,4 - tetrahydrocarbazolyl)]-acetamidoxime O-benzyl ether, described above in Example 2, with sodium nitrite in the presence of hydrochloric acid at a temperature from about 0° C. to 5° C., there can be obtained α-[9-(1,2,3,4-tetrahydrocarbazolyl)]acetohydroxamic chloride O-benzyl ether. By reacting the latter with diethylamine, there can be obtained α-[9-(1,2,3,4-tetrahydrocarbazolyl)] - N,N - diethylacetamidoxime O-benzyl ether. By reducing the latter with hydrogen over a palladium-on-charcoal catalyst, there can be obtained α-[9-(1,2,3,4-tetrahydrocarbazoyl)] - N,N - diethylacetamidoxime.

Similarly, by reaction of α-[9-(1,2,3,4-tetrahydrocarbazolyl)]acetohydroxamic chloride O-benzyl ether with dibutyl amine and reduction of the resulting N,N-dibutylacetamidoxime with hydrogen over a palladium-on-charcoal catalyst, there can be obtained α-[9-(1,2,3,4-tetrahydrocarbazolyl)]-N,N-dibutylacetamidoxime.

EXAMPLE 5

α-[9-(1,2,3,4-tetrahydrocarbazolyl)]acetohydroamic acid oxime [Ia: $R_1$ is OH; $R_2$ and $R_3$ are H; Y' is $CH_2$].

By reacting the α-[9 - (1,2,3,4-tetrahydrocarbazolyl)]-acetohydroxamic chloride O-benzyl ether described above in Example 4 with hydroxylamine, there can be obtained α-[9-(1,2,3,4-tetrahydrocarbazolyl)]acetohydroxamic acid oxime O-benzyl ether. By reducing the latter with hydrogen over a palladium-on-charcoal catalyst, there can be obtained α-[9-(1,2,3,4-tetrahydrocarbazolyl)]acetohydroxamic acid oxime. Similarly, by replacing the hydroxylamine by N-methylhydroxylamine, there can be obtained α-[9 - (1,2,3,4 - tetrahydrocarbazolyl)]-N-methylacetohydroxamic acid oxime.

EXAMPLE 6

α - [9 - (1,2,3,4 - tetrahydrocarbazolyl)] - α - hydroxyacetamidoxime [Ia: $R_1$, $R_2$, and $R_3$ are H; Y' is CHOH].

By reacting α-[9 - (1,2,3,4-tetrahydrocarbazolyl)]-carboxaldehyde with hydrogen cyanide, and reacting the resulting aldehyde cyanohydrin with hydroxylamine using the manipulative procedure described above in Example 1, there can be obtained α-[9 - (1,2,3,4 - tetrahydrocarbazolyl)]-α-hydroxyacetamidoxime.

EXAMPLE 7

α - [9 - (1,2,3,4 - tetrahydrocarbazolyl)] - N-acetylacetamidoxime O-acetate [Ia: $R_1$ and $R_3$ are $CH_3CO$; $R_2$ is H; Y' is $CH_2$].

By reacting α-[9 - (1,2,3,4-tetrahydrocarbazolyl)]-acetamidoxime with acetic anhydride in the presence of pyridine there can be obtained α-[9 - (1,2,3,4-tetrahydrocarbazolyl)]-N-acetylacetamidoxime O-acetate.

Similarly by reaction of α-[9 - (1,2,3,4-tetrahydrocarbazolyl)]acetamidoxime with isobutyric anhydride, there can be obtained α-[9-(1,2,3,4-tetrahydrocarbazolyl)]-N-isobutyrylacetamidoxime O-isobutyrate.

EXAMPLE 8

β-[9-(1,2,3,4-tetrahydrocarbazolyl)]propionamidoxime [Ia: $R_1$, $R_2$, $R_3$ are H; Y' is $CH_2CH_2$].

By reaction of 1,2,3,4-tetrahydrocarbazole with acrylonitrile in benzene in the presence of potassium hydroxide, there is obtained β-[9 - (1,2,3,4-tetrahydrocarbazolyl)]-propionitrile. Reaction of the latter with hydroxylamine in ethanol in the presence of sodium carbonate using the procedure described above in Example 1 affords β-[9-(1,2,3,4-tetrahydrocarbazolyl)]propionamidoxime.

EXAMPLE 9

β-[9 - (1,2,3,4 - tetrahydrocarbazolyl)]-α-methylpropionamidoxime [Ia: $R_1$, $R_2$, and $R_3$ are H; Y' is $CH_2CH(CH_3)$].

Reaction of 1,2,3,4-tetrahydrocarbazole with α-methylacrylonitrile in benzene in the presence of potassium hydroxide according to the procedure described above in Example 8 affords β-[9-(1,2,3,4 - tetrahydrocarbazolyl)]-α-methylpropionitrile. Reaction of the latter with hydroxylamine in ethanol in the presence of sodium carbonate according to the procedure described above in Example 1 affords β-[9 - (1,2,3,4 - tetrahydrocarbazolyl)]-α-methylpropionamidoxime.

EXAMPLE 10

ε-[9-(1,2,3,4-tetrahydrocarbazolyl)]caproamidoxime [Ia: $R_1$, $R_2$, and $R_3$ are H; Y' is $(CH_2)_5$]

Reaction of 1,2,3,4-tetrahydrocarbazole with ε-bromocapronitrile in dimethylformamide in the presence of sodium hydride according to the procedure described above in Example 1 affords ε-[9-(1,2,3,4-tetrahydrocarbazolyl)]-capronitrile. Reaction of the latter with hydroxylamine in ethanol in the presence of sodium carbonate using the procedure described above in Example 1 affords ε-[9-(1,2,3,4-tetrahydrocarbazolyl)]-caproamidoxime.

EXAMPLE 11

γ-[9-(1,2,3,4-tetrahydrocarbazolyl)]butyramidoxime [Ia: $R_1$, $R_2$, and $R_3$ are H; Y' is $(CH_2)_3$]

Reaction of 1,2,3,4-tetrahydrocarbazole with γ-bromobutyronitrile in dimethylformamide in the presence of sodium hydride using the procedure described above in Example 1 affords γ-[9-(1,2,3,4-tetrahydrocarbazolyl)]-butyronitrile. Reaction of the latter with hydroxylamine in ethanol in the presence of sodium carbonate using the procedure described above in Example 1 affords γ-[9-(1,2,3,4-tetrahydrocarbazolyl)]butyramidoxime.

EXAMPLE 12

α - [9 - (1,2,3,4 - tetrahydrocarbazolyl)] - N-benzyl-N-methylacetamidoxime [Ia: $R_1$ is $C_6H_5CH_2$; $R_2$ is $CH_3$; $R_3$ is H; Y' is $CH_2$].

Reaction of the α-[9-(1,2,3,4-tetrahydrocarbazolyl)]-acetohydroxamic chloride O-benzyl ether described above in Example 4 with N-benzyl-N-methylamine using the procedure described above in Example 4 affords α-[9-(1,2,3,4 - tetrahydrocarbazolyl)]-N-benzyl-N-methylacetamidoxime O-benzyl ether.

By reducing the latter with one mole of hydrogen over a palladium-on-charcoal catalyst, there can be obtained α - [9 - (1,2,3,4 - tetrahydrocarbazolyl)] - N-benzyl-N-methylacetamidoxime.

Similarly by reaction of the α-[9-(1,2,3,4-tetrahydrocarbazolyl)]acetohydroxamic chloride O-benzyl ethyl with methylamine or N,N-dimethylamine and catalytic reduction of the resulting acetamidoxime O-benzyl ethers with hydrogen over a palladium-on-charcoal catalyst, there is obtained α-[9 - (1,2,3,4-tetrahydrocarbazolyl)]-N-methylacetamidoxime and α-[9-(1,2,3,4-tetrahydrocarbazolyl)]-N,N-dimethylacetamidoxime, respectively. By reaction of the latter with methyl iodide in the presence of sodium hydroxide using the procedure described above in Example 3, there is obtained α-[9-(1,2,3,4-tetrahydrocarbazolyl)]-N-methylacetamidoxime O-methyl ether and α-[9 - (1,2,3,4 - tetrahydrocarbazolyl)]-N,N-dimethylacetamidoxime O-methyl ether, respectively.

Similarly by reaction of α-[9-(1,2,3,4-tetrahydrocarbazolyl)]acetohydroxamic chloride O-benzyl ether with 2-acetylbenzylamine and catalytic reduction with one mole of hydrogen of the resulting α-[9-(1,2,3,4-tetrahydrocarbazolyl)]-N-(2 - acetylbenzyl)acetamidoxime O-benzyl ether, there is obtained α-[9 - (1,2,3,4 - tetrahydrocarbazolyl)]-N-(2-acetylbenzyl)acetamidoxime.

EXAMPLE 13

α-[9-(1,2,3,4-tetrahydrocarbazolyl)] - N,N - dibenzylacetamidoxime [Ia: $R_1$ and $R_2$ are $C_6H_5CH_2$; $R_3$ is H; Y' is $CH_2$]

By reaction of the α-[9-(1,2,3,4-tetrahydrocarbazolyl)] acetohydroxamic chloride O-benzyl ether described above in Example 4 with N,N-dibenzylamine using the procedure described above in Example 4, and reducing with one mole of hydrogen over a palladium-on-charcoal catalyst the resulting α - [9 - (1,2,3,4 - tetrahydrocarbazolyl)]-N,N-dibenzylacetamidoxime O-benzyl ether, there is obtained α-[9-(1,2,3,4-tetrahydrocarbazolyl)] - N,N - dibenzylacetamidoxime.

EXAMPLE 14

α-[9-(1,2,3,4 - tetrahydrocarbazolyl)]-N-benzoylacetamidoxime O-benzoate [Ia: $R_1$ and $R_3$ are $C_6H_5CO$; $R_2$ is H; Y' is $CH_2$]

By reacting α-[9-(1,2,3,4-tetrahydrocarbazolyl)]-acetamidoxime with benzoic anhydride in the presence of pyridine, there is obtained α-[9-(1,2,3,4-tetrahydrocarbazolyl)]-N-benzoylacetamidoxime-O-benzoate.

EXAMPLE 15

α-[9-(1,2,3,4 - tetrahydrocarbazolyl)]-N-allylacetamidoxime [Ia: $R_1$ is $CH_2CH=CH_2$; $R_2$ and $R_3$ are H; Y' is $CH_2$]

By reaction of the α-[9-(1,2,3,4-tetrahydrocarbazolyl)] acetohydroxamic chloride O-benzyl ether described above in Example 4 with allylamine, there is obtained α-[9-(1,2,3,4-tetrahydrocarbazolyl)]-N-allylacetamidoxime O-benzyl ether. Reduction of the latter with hydrogen over a palladium-on-charcoal catalyst affords α-[9-(1,2,3,4-tetrahydrocarbazolyl)]-N-allylacetamidoxime.

EXAMPLE 16

α-[9-(1,2,3,4 - tetrahydrocarbazolyl)] - N - propynylacetamidoxime [Ia: $R_1$ is $CH_2C\equiv CH$; $R_2$ and $R_3$ are H; Y' is $CH_2$]

Reaction of the α-[9-(1,2,3,4-tetrahydrocarbazolyl)] acetohydroxamic chloride O-benzyl ether described above in Example 4 with propargylamine using the procedure described above in Example 4 affords α-[9-(1,2,3,4-tetrahydrocarbazolyl)] - N - propynylacetamidoxime O-benzyl ether. Catalytic reduction of the latter with one mole of hydrogen over a palladium-on-charcoal catalyst affords α-[9-(1,2,3,4 - tetrahydrocarbazolyl)] - N - propynylacetamidoxime.

Similarly by reaction of α-[9-(1,2,3,4-tetrahydrocarbazolyl)]acetohydroxamic chloride O-benzyl ether with N,N-di-(2-methyl-2-propenyl)amine or N,N-di-(2-butynyl)-amine and catalytic reduction of the resulting acetamidoxime O-benzyl ethers, there is obtained α-[9-(1,2,3,4 - tetrahydrocarbazolyl)] - N,N - di - (2-methyl-2-propenyl)acetamidoxime or α-[9-(1,2,3,4-tetrahydrocarbazolyl)] - N,N - di - (2-butynyl)-acetamidoxime, respectively.

EXAMPLE 17

By reaction of cyclohexanone in refluxing glacial acetic acid with 4-chlorophenylhydrazine, 4-methylphenylhydrazine, 3 - methoxyphenylhydrazine, 4 - methylsulfonylphenylhydrazine, 3-trifluoromethylphenylhydrazine, or 3,4-methylenedioxyphenylhydrazine, and isolating the product from a neutral medium there is obtained, respectively, 6 - chloro - 1,2,3,4 - tetrahydrocarbazole, 6-methyl-1,2,3,4-tetrahydrocarbazole, 7-methoxy-1,2,3,4-tetrahydrocarbazole, 6-methylsulphonyl-1,2,3,4-tetrahydrocarbazole, 7 - trifluoromethyl - 1,2,3,4 - tetrahydrocarbazole, or 6,7-methylenedioxy-1,2,3,4-tetrahydrocarbazole.

Reaction of the latter with α-chloro-acetonitrile in dimethylformamide in the presence of sodium hydride using the procedure described above in Example 1 affords α-[9-(6-chloro-1,2,3,4-tetrahydrocarbazolyl)]acetonitrile, α-[9-(6-methyl-1,2,3,4-tetrahydrocarbazolyl)]acetonitrile, α-[9-(7-methoxy - 1,2,3,4 - tetrahydrocarbazolyl)]acetonitrile, acetonitrile, α-[9-(7-trifluoromethyl-1,2,3,4-tetrahydrocaracetonitrile, α-[9-(7-trifluoromethyl-1,2,3,4-tetrahydrocarbazolyl)]acetonitrile, or α-[9-(6,7-methylenedioxy-1,2,3,4-tetrahydrocarbazolyl)]acetonitrile, respectively.

Reaction of the latter with hydroxylamine in ethanol in the presence of sodium carbonate using the procedure described above in Example 1 affords, respectively, α-[9-(6-chloro - 1,2,3,4 - tetrahydrocarbazolyl)]acetamidoxime, α-[9-(6-methyl - 1,2,3,4 - tetrahydrocarbazolyl)]acetamidoxime, α-[9-(7-methoxy - 1,2,3,4 - tetrahydrocarbazoyl)]acetamidoxime, α-[9-(6 - methylsulphonyl-1,2,3,4-tetrahydrocarbazolyl)]acetamidoxime, α-[9-(7 - trifluoromethyl-1,2,3,4 - tetrahydrocarbazolyl)]acetamidoxime, or α-[9-(6,7-methylenedioxy-1,2,3,4 - tetrahydrocarbazolyl)]acetamidoxime.

EXAMPLE 18

α-[9-(1,2,3,4-tetrahydrocarbazolyl)]acetamidine [Ib: $R_2$ and $R_4$ are H; Y' is $CH_2$]

Reaction of the α-[9-(1,2,3,4-tetrahydrocarbazolyl)] acetonitrile described above in Example 1 with anhydrous ethanolic hydrogen chloride followed by treatment of the resulting imidate ester with anhydrous ammonia in ethanol affords α-[9-(1,2,3,4-tetrahydrocarbazolyl)]acetamidine.

EXAMPLE 19

α-[9-(1,2,3,4-tetrahydrocarbazolyl)]-N,N-dimethylacetamidine [Ib: $R_2$ and $R_4$ are $CH_3$; Y' is $CH_2$]

Reaction of the α-[9 - (1,2,3,4 - tetrahydrocarbazolyl] acetonitrile described above in Example 1 with anhydrous ethanolic hydrogen chloride followed by treatment of the resulting imidate ester with dimethylamine in ethanol affords α-[9-(1,2,3,4-tetrahydrocarbazolyl)]-N,N-dimethylacetamidine.

EXAMPLE 20

β - [9 - (1,2,3,4-tetrahydrocarbazolyl)]-N-benzyl-N-methylpropionamidine [Ib: $R_2$ is $C_6H_5CH_2$; $R_4$ is $CH_3$; Y' is $CH_2CH_2$]

Reaction of the β-[9-(1,2,3,4-tetrahydrocarbazolyl)]propionitrile described above in Example 8 with anhydrous ethanolic hydrogen chloride followed by treatment of the resulting imidate ester with N-benzyl-N-methylamine affords β-[9-(1,2,3,4-tetrahydrocarbazolyl)] - N - benzyl-N-methylpropionamide.

Similarly reaction of the imidate ester prepared from β-[9-(1,2,3,4-tetrahydrocarbazolyl)]propionitrile with N-(3-chlorobenzyl)-N-methylamine or N-(2-acetylbenzyl)-amine affords, respectively, β-[9-(1,2,3,4-tetrahydrocarbazolyl)]-N-(3-chlorobenzyl) - N - methylpropionamidine [Ib: $R_2$ is $3-ClC_6H_4CH_2$; $R_4$ is $CH_3$; Y' is $CH_2CH_2$] or β-[9-(1,2,3,4 - tetrahydrocarbazolyl)]-N-(2-acetylbenzyl) propionamidine [Ib: $R_2$ is $2-CH_3COC_6H_4CH_2$; $R_4$ is H; Y' is $CH_2CH_2$].

EXAMPLE 21

β - [9 - (1,2,3,4-tetrahydrocarbazolyl)]-α-methyl-N,N-dibenzylpropionamidine [Ib: $R_2$ and $R_4$ are $C_6H_5CH_2$; Y' is $CH_2CH(CH_3)$]

Reaction of the β-[9-(1,2,3,4-tetrahydrocarbazolyl)]-α-methylpropionitrile described above in Example 9 with anhydrous ethanolic hydrogen chloride followed by treatment of the resulting imidate ester with dibenzylamine affords β - [9 - (1,2,3,4-tetrahydrocarbazolyl)]-α-methyl-N,N-dibenzylpropionamidine.

EXAMPLE 22

ε-[9-(1,2,3,4-tetrahydrocarbazolyl)]caproamidine [Ib: $R_2$ and $R_4$ are H; Y' is $(CH_2)_5$]

Reaction of the ε-[9-(1,2,3,4-tetrahydrocarbazolyl)]-capronitrile described above in Example 10 with anhydrous ethanolic hydrogen chloride followed by treatment of the resulting imidate ester with anhydrous ammonia in ethanol affords ε-[9-(1,2,3,4-tetrahydrocarbazolyl)]caproamidine.

EXAMPLE 23

γ-[9-(1,2,3,4-tetrahydrocarbazolyl)]butyramidine [Ib: $R_2$ and $R_4$ are H; Y' is $(CH_2)_3$]

Reaction of the γ-[9-(1,2,3,4-tetrahydrocarbazolyl)]butyronitrile described above in Example 11 with anhydrous hydrogen chloride followed by treatment of the resulting imidate ester with anhydrous ammonia in ethanol affords γ-[9-(1,2,3,4-tetrahydrocarbazolyl)]butyramidine.

EXAMPLE 24

α-[9-(1,2,3,4-tetrahydrocarbazolyl)]-N-allylacetamidine [Ib: $R_2$ is $CH_2CH=CH_2$; $R_4$ is H; Y' is $CH_2$]

Reaction of the α-[9-(1,2,3,4-tetrahydrocarbazolyl)]acetonitrile described above in Example 1 with anhydrous ethanolic hydrogen chloride followed by treatment of the resulting imidate ester with N-allylamine in ethanol affords α-[9-(1,2,3,4-tetrahydrocarbazolyl)] - N - allylacetamidine.

EXAMPLE 25

α-[9-(1,2,3,4-tetrahydrocarbazolyl)]-N-propynylacetamidine [Ib: $R_2$ is $CH_2C≡CH$; $R_4$ is H; Y' is $CH_2$]

Reaction of the α-[9-(1,2,3,4-tetrahydrocarbazolyl)] acetonitrile described above in Example 1 with anhydrous ethanolic hydrogen chloride followed by treatment of the resulting imidate ester with propargylamine affords α-[9 - (1,2,3,4 - tetrahydrocarbazolyl)] - N - propynylacetamidine.

Similarly by reaction of α-[9-(1,2,3,4-tetrahydrocarbazolyl)]acetonitrile with ethanolic hydrogen chloride followed by treatment of the resulting imidate ester with N,N-di-(2-methyl - 2 - propenyl)amine or N,N - di-(2-butynyl)amine there is obtained α-[9-(1,2,3,4-tetrahydrocarbazolyl)]-N,N-di-(2 - methyl-2-propenyl)acetamidine or α-[9-(1,2,3,4-tetrahydrocarbazolyl)] - N,N - di - (2-butynyl)acetamidine, respectively.

I claim:
1. A compound of the formula

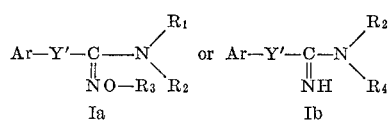

wherein

Ar is: 9-(1,2,3,4-tetrahydrocarbazolyl);
$R_1$ is: hydrogen, lower-alkyl, lower alkenyl, lower-alkynyl, lower-alkanoyl, or hydroxy;
$R_2$ is: hydrogen, lower-alkenyl, lower-alkynyl, lower-alkyl, or benzyl;
$R_3$ is: hydrogen, lower-alkanoyl, benzoyl, lower-alkyl, or benzyl;
$R_4$ is: hydrogen, lower-alkenyl, lower-alkynyl, lower-alkyl, or benzyl; and
Y' is: alkylene of from one to five carbon atoms.

2. A compound according to claim 1 of Formula 1a wherein $R_1$ is hydrogen, and $R_2$ and $R_3$ are each hydrogen or lower-alkyl.

3. A compound according to claim 1 where $R_2$ is hydrogen and $R_1$ and $R_3$ are each hydrogen or lower-alkyl.

4. A compound according to claim 1 where $R_3$ is hydrogen, and $R_1$ and $R_2$ are each hydrogen or lower-alkyl.

5. A compound according to claim 2 where Y' is methylene.

6. A compound according to claim 3 where Y' is methylene.

7. A compound according to claim 4 where Y' is methylene.

8. A compound of Formula Ib according to claim 1 wherein $R_2$ and $R_4$ each is hydrogen.

References Cited

UNITED STATES PATENTS 3,030,378    4/1962    Mull _____ 260—313

OTHER REFERENCES

Mull (I), JACS 80: 3769–72 (7–58).

HENRY R. JILES, Primary Examiner

CECILIA M. SHURKO, Assistant Examiner

U.S. Cl. X.R.

260—577, 583; 424—274

UNITED STATES PATENT OFFICE
CERTIFICATE OF CORRECTION

Patent No. 3,538,112      Dated November 3, 1970

Inventor(s) Malcolm R. Bell

It is certified that error appears in the above-identified patent and that said Letters Patent are hereby corrected as shown below:

Column 2, lines 3-6, the formula which is shown as:

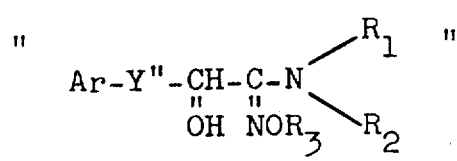 should show as 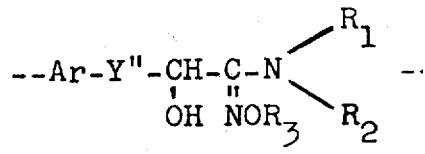

line 21, "inter ali" should read --inter alia--.

Column 7, line 51, "reducting" should read --reducing--; line 53, "tetrahydrocarbazoyl" should read --tetrahydrocarbazolyl--; line 64, "acetohydroamic" should read --acetohydroxamic--.

Signed and sealed this 4th day of January 1972.

(SEAL)
Attest:

EDWARD M. FLETCHER, JR.
Attesting Officer

ROBERT GOTTSCHALK
Acting Commissioner of Patents